United States Patent
Chou et al.

(10) Patent No.: US 10,152,991 B2
(45) Date of Patent: Dec. 11, 2018

(54) METHOD FOR MANUFACTURING THERMALLY-ASSISTED MAGNETIC RECORDING HEAD WITH WAVEGUIDE BLOCKER

(71) Applicant: Headway Technologies, Inc., Milpitas, CA (US)

(72) Inventors: Tsutomu Chou, Nagano (JP); Kouji Shimazawa, Nagano (JP); Tobias Maletzky, San Jose, CA (US); Weihao Xu, San Jose, CA (US); Shinji Hara, Nagano (JP); Yoshihiro Tsuchiya, Nagano (JP); Yiming Wang, San Jose, CA (US); Cherng-Chyi Han, San Jose, CA (US); Xuhui Jin, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/837,205

(22) Filed: Dec. 11, 2017

(65) Prior Publication Data

US 2018/0182419 A1 Jun. 28, 2018

Related U.S. Application Data

(62) Division of application No. 15/235,171, filed on Aug. 12, 2016, now Pat. No. 9,852,752.

(51) Int. Cl.
| | | |
|---|---|---|
| *G11B 11/00* | (2006.01) | |
| *G11B 5/48* | (2006.01) | |
| *G11B 5/31* | (2006.01) | |
| *G11B 5/60* | (2006.01) | |
| *G11B 5/127* | (2006.01) | |

(Continued)

(52) U.S. Cl.
CPC .......... *G11B 5/4866* (2013.01); *G11B 5/1278* (2013.01); *G11B 5/314* (2013.01); *G11B 5/3106* (2013.01); *G11B 5/3136* (2013.01); *G11B 5/3163* (2013.01); *G11B 5/6082* (2013.01); *G11B 5/6088* (2013.01);

(Continued)

(58) Field of Classification Search
None
See application file for complete search history.

(56) References Cited

U.S. PATENT DOCUMENTS

| | | | |
|---|---|---|---|
| 8,000,178 B2 | 8/2011 | Shimazawa et al. | |
| 8,295,132 B2 * | 10/2012 | Jin | G11B 5/1278 369/13.33 |

(Continued)

*Primary Examiner* — Tan X Dinh
(74) *Attorney, Agent, or Firm* — Saile Ackerman LLC; Stephen B. Ackerman

(57) ABSTRACT

A method for manufacturing a TAMR (thermal assisted magnetic recording) write head. The write head has a metal blocker formed against a distal end of a waveguide. The waveguide focuses optical radiation on an adjacent plasmon generator where it excites plasmon modes that heat the recording medium. Although the plasmon generator typically heats the recording medium using the plasmon near field to supply the required Joule heating, an unblocked waveguide would also send optical radiation to the medium and surrounding structures producing unwanted heating and device unreliability. The role of the blocker is to block the unwanted optical radiation and, thereby, to limit the heating to that supplied by the plasmon near field.

11 Claims, 9 Drawing Sheets

(51) Int. Cl.
*G11B 5/00* (2006.01)
*G11B 11/105* (2006.01)

(52) U.S. Cl.
CPC ..... *G11B 11/1051* (2013.01); *G11B 11/10506* (2013.01); *G11B 2005/0021* (2013.01)

(56) References Cited

U.S. PATENT DOCUMENTS

| | | | |
|---|---|---|---|
| 8,599,656 B2* | 12/2013 | Jin | G11B 5/314 369/13.33 |
| 8,630,153 B1* | 1/2014 | Wang | G11B 5/1278 369/13.33 |
| 8,773,803 B2* | 7/2014 | Jin | G11B 5/314 369/13.33 |
| 9,025,422 B2 | 5/2015 | Aoki et al. | |
| 9,852,752 B1* | 12/2017 | Chou | G11B 5/4866 369/13.33 |
| 9,958,769 B1* | 5/2018 | Araki | G03F 1/38 369/13.33 |
| 2011/0181979 A1* | 7/2011 | Jin | G11B 5/314 369/13.33 |
| 2012/0092971 A1 | 4/2012 | Schreck et al. | |
| 2013/0064502 A1* | 3/2013 | Peng | G11B 5/6088 369/13.33 |
| 2015/0162029 A1* | 6/2015 | Sasaki | G11B 5/3169 369/13.33 |
| 2015/0248906 A1* | 9/2015 | Itagi | G11B 5/4866 369/13.33 |
| 2016/0351209 A1* | 12/2016 | Chen | G11B 5/314 369/13.33 |
| 2017/0032811 A1* | 2/2017 | Chen | G11B 5/6082 369/13.33 |

* cited by examiner

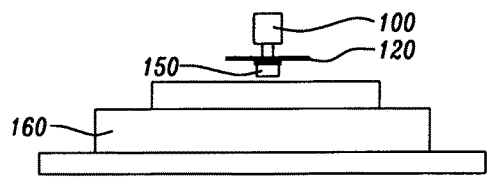
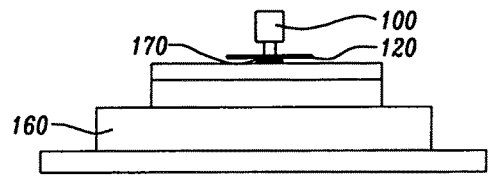
FIG. 1A
Prior Art
FIG. 1B
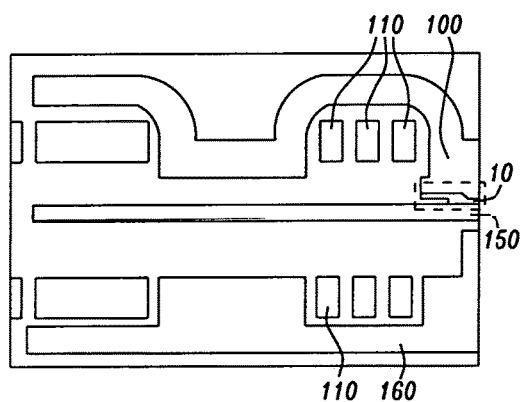
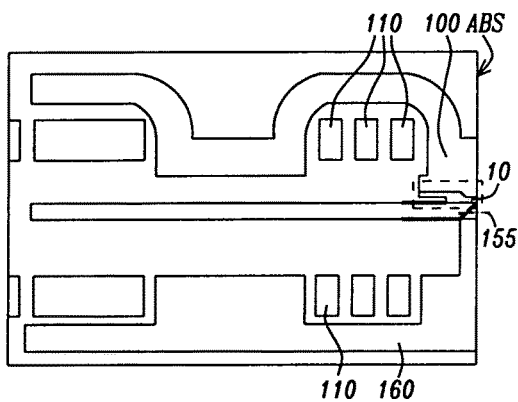
FIG. 1C
Prior Art
FIG. 1D
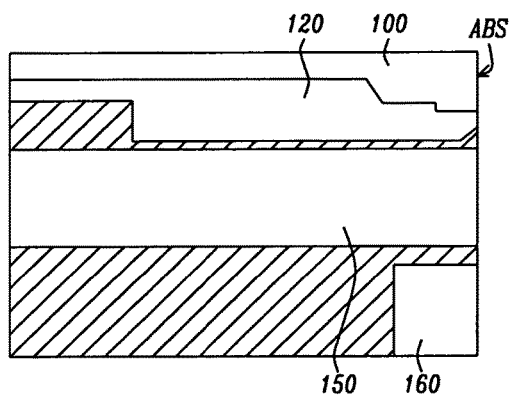
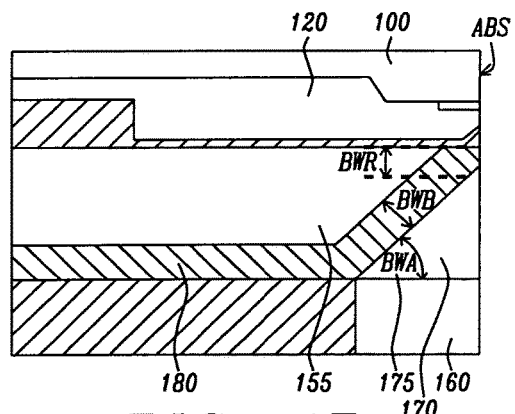
FIG. 1E
Prior Art
FIG. 1F

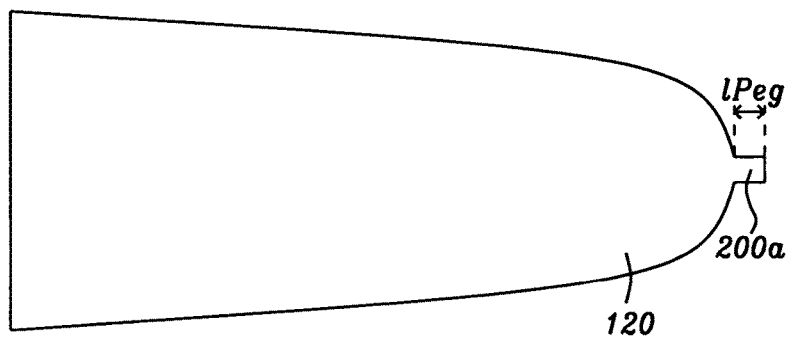 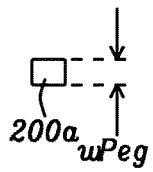
FIG. 2A
FIG. 2B
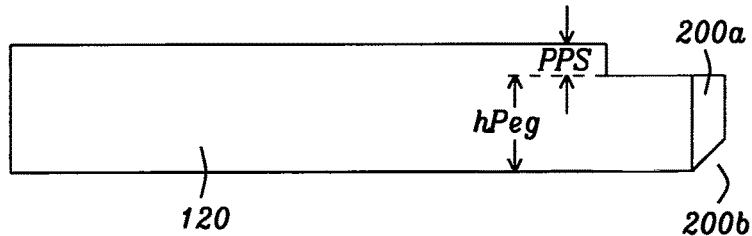 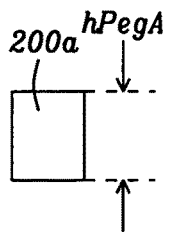
FIG. 2C
FIG. 2D

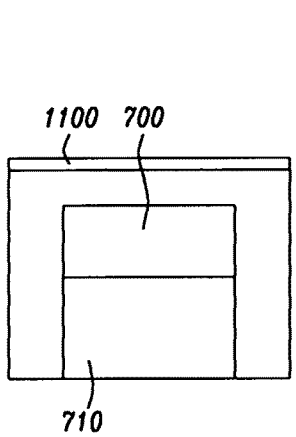
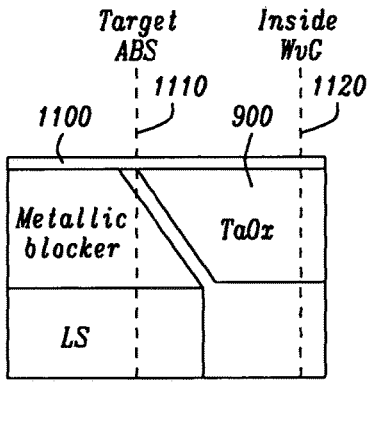
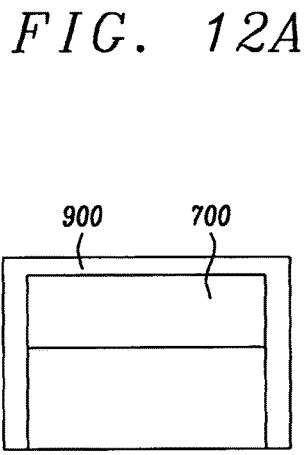
FIG. 11A   FIG. 11B   FIG. 11C
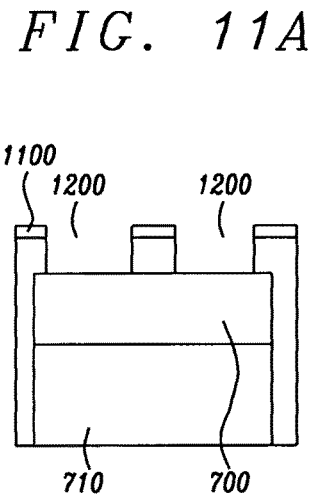
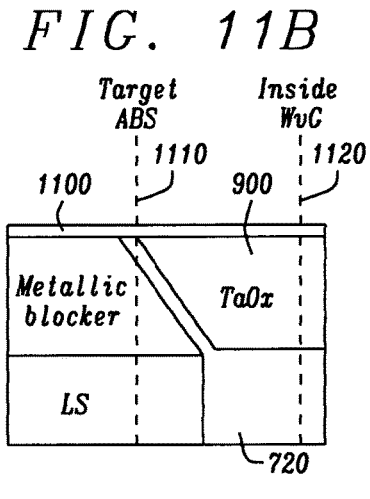
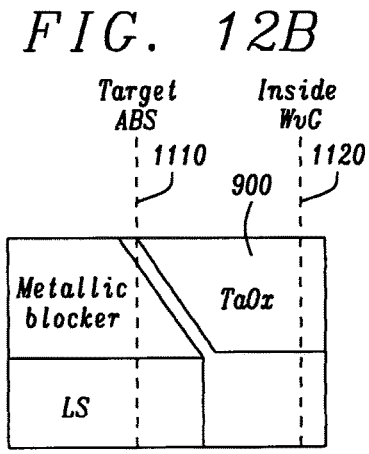
FIG. 12A   FIG. 12B   FIG. 12C
FIG. 13A   FIG. 13B   FIG. 13C

METHOD FOR MANUFACTURING THERMALLY-ASSISTED MAGNETIC RECORDING HEAD WITH WAVEGUIDE BLOCKER

This is a Divisional Application of U.S. patent application Ser. No. 15/235,171 filed on Aug. 12, 2016, which is herein incorporated by reference in its entirety and assigned to a common assignee.

BACKGROUND

1. Technical Field

This disclosure relates to magnetic write heads that write on magnetic recording media, particularly to write heads that use Thermally Assisted Magnetic Writing (TAMR) produced by the absorption of plasmon near-field energy.

2. Description

As hard disk drives have been increasing the recording density of the magnetic disks on which data storage occurs, the thin-film magnetic heads used to write and read that data have been required to improve their performance as well. The thin-film read/write heads most commonly in use are of a composite type, having a structure in which a magnetism detecting device, such as a magnetoresistive (MR) read sensor is used together with a magnetic recording device, such as an electromagnetic coil device. These two types of devices are laminated together and serve to read/write data signals, respectively, from/onto magnetic disks which are the magnetic recording media.

In general, a magnetic recording medium, on a microscopic level of composition, is a discontinuous body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, and thereby worsens the thermal stability. Though $K_U$ may be made greater at the same time as a measure against this problem, the increase in $K_U$ also increases the coercivity of the magnetic recording medium. However, the writing magnetic field intensity produced by a magnetic head is substantially determined by the saturated magnetic flux density of a soft magnetic material constituting a magnetic pole within the head. Therefore, there can be no writing if the coercivity exceeds a permissible value determined by the limit of writing magnetic field intensity.

One method proposed for solving such a problem affecting the thermal stability of magnetization is the so-called thermally assisted (or activated) magnetic recording (TAMR) scheme. In this approach, heat is applied to a magnetic recording medium immediately before applying a writing magnetic field, particularly while using a magnetic material having a large value of $K_U$. The heat then effectively lowers the medium's coercivity at the same position where the magnetic writing field is applied, so as to enable writing as though it were on a medium with lowered coercivity. This approach is expected to ultimately enable recording densities at between approximately 1 and 10 Tb/inch².

TAMR is roughly classified into magnetic dominant recording and optical dominant recording, depending on the relative effects of the magnetic field and the optical heating. In magnetic dominant recording, the writing is attributed to the localized effects of the electromagnetic coil writer, while the radiation diameter of the incident light is greater than the track width (recording width). In optical dominant recording, by contrast, the writing is attributed to the light-radiating effect, as the radiation diameter of the incident light is substantially the same as the track width (recording width). Thus, the terms "magnetic dominant recording" and "optical dominant recording" imply the effects of spatial resolution to a magnetic field or a radiation field, respectively.

In the thermally assisted magnetic head recording apparatus, a light (optical radiation) source such as a semiconductor laser is typically suggested as the source of thermal energy. Light from such a light-emitting device is introduced into an optical waveguide configured to propagate the light. As waveguide core material, TaOx or SiON is typically used. The waveguide is surrounded with cladding material, typically Al2O3, SiON or SiO2. The combination supports a travelling mode of electromagnetic radiation. The waveguide propagated electromagnetic radiation is transferred, by coupling, to a plasmon generator adjacent to the waveguide at the distal end of the waveguide, where it excites plasmon modes. The plasmon generator is usually made of highly conductive material such as Au or Ag. The light focused by the waveguide at the plasmon generator is emitted, as plasmon near-field energy, and heats the surface of recording media. Since the plasmon energy is transferred to the magnetic medium from the near field of the plasmon rather than by directly focusing the optical radiation of the laser, the size of the region on the recording medium that can be effectively heated is not limited by diffraction effects of the radiation and is, therefore, much smaller than would be produced by using the optical radiation directly.

The reliability of TAMR heads is presently of great concern. Since the TAMR recording requires that the recording layer of the magnetic medium be heated above its Curie temperature, the medium itself becomes a significant source of heat. Due to the small gap of approximately 2 nm between the medium surface and the write head, several heat transfer mechanisms can contribute to a heat flux across the air gap between the head and the medium. In particular, the light from the waveguide itself can heat the medium. This heat spot in the medium can significantly increase the temperature of the head which is closely opposite to the heat spot. Since the head surface in that region consists of materials having low thermal conductivity, the increase in head temperature can be great. It is therefore a significant problem to protect the head from the thermal effects of the heated medium surface so that the performance of the head is not degraded by its increasing temperature. These and related problems have been discussed in the prior art. Examples include: U.S. Patent Application 2012/0092971 (Shreck et al) that discloses a light block made from opaque material to prevent light from directly entering the waveguide from the light source; U.S. Pat. No. 8,773,803 (Jin et al) that describes a small optical spot formed by having a waveguide edge plasmon gap larger than the plasmon shield gap; U.S. Pat. No. 8,599,656 (Jin et al) teaches that the peg on the plasmon generator will reduce the size of the optical spot; U.S. Pat. No. 8,295,132 (Jin et al.) teaches that a plasmon shield can shape the optical spot. The effect of reducing the gap between the leading magnetic shield and the main pole is also described by Wang et al. (U.S. Pat. No. 8,630,153, but no suppression of media heating by remaining light in the waveguide region could be achieved. However, none of the above references deal with the particular problem to be addressed herein nor can their teachings be applied to that problem in the manner to be applied herein.

SUMMARY

The first object of this disclosure is to fabricate a TAMR write head that uses optically generated plasmon energy for the thermal activation of a magnetic recording medium, that reduces temperatures of the dielectric head in regions in front of the waveguide (i.e., between the waveguide and the medium).

A second object of this disclosure is to provide a faster rise time of the write element in case the structure provided includes the use of magnetic materials.

A third object of this disclosure is to provide improved dimensional tolerances for the head and improved thermal spot confinement in the recording layer due to suppression of an undesired wide area of heating if the coupling between the waveguide and the plasmon generator is not optimal.

A fourth object of this disclosure is to provide protection of the near field plasmon generator from head-disk contacts by surrounding it on both down-track sides of the slightly more protruding main pole and the waveguide blocker.

These and other problems to be solved will be addressed herein by the formation of a waveguide blocker which suppresses optical electromagnetic radiation that remains within the waveguide from being emitted in the form of radiative energy (as opposed to the required plasmon near-field energy) and impinging upon regions of the medium and the dielectric material surrounding the writer. This electromagnetic radiation, if it is not blocked, would heat the recording medium unnecessarily which, in turn, would heat the opposing dielectric regions surrounding the head. Thus, the waveguide blocker reduces the head temperature, which is highly desirable. In turn, there are fewer failures of head structures, smaller head protrusion, less medium and head overcoat damage and reduced degradation of lubricants. Thus, the waveguide blocker increases the lifetime of TAMR heads. If the blocker can be fabricated of magnetic materials, it will improve the rise-time of the magnetic write head. In addition, in the event of slight blocker protrusion due to surface topography of the ABS subsequent to lapping during the slider production process, it can protect the peg from head-disk interaction (HDI).

BRIEF DESCRIPTION OF THE DRAWINGS

FIG. 1A-FIG. 1F is a series of schematic representations of a TAMR writer showing a write element and the associated apparatus of a waveguide and a plasmon generator for transferring optical energy to a recording medium. A prior art version (no blocker) is shown in three views in FIGS. 1A, 1C and 1E and the presently disclosed version (with blocker) is shown in FIGS. 1B, 1D and 1F.

FIGS. 2A and 2B and FIGS. 2C and 2D are schematic top and side cross-sectional representations of the plasmon generator used to construct the system in FIG. 1A-FIG. 1F. The generator is an exemplary prior art type, but other forms are usable.

FIGS. 6A-D are graphical representations of a comparison between the magnetic performance of the writer with and without the blocker.

FIGS. 7A-D schematically shows an initial process step in the fabrication of the blocker. An ABS view A and a side cross-sectional view B are shown.

FIGS. 8A-D schematically shows the next process step following FIG. 7A-D. The same two views are shown.

FIGS. 9A-D shows two schematic views of yet a further process step, showing the deposition of the core material of the waveguide.

FIGS. 10A-D shows two schematic views of yet a further process step, showing the removal of excess core material.

FIGS. 11A-C shows three schematic views of yet a further process step, showing the formation of a metal mask that will be used to pattern the waveguide.

FIGS. 12A-C shows three schematic views of yet a further process step, showing the patterning of the mask to enable the cladding of the waveguide.

FIGS. 13A-C shows three schematic views of a final process step, showing the side cladding of the waveguide core.

DETAILED DESCRIPTION

Figures 3A, 3B:
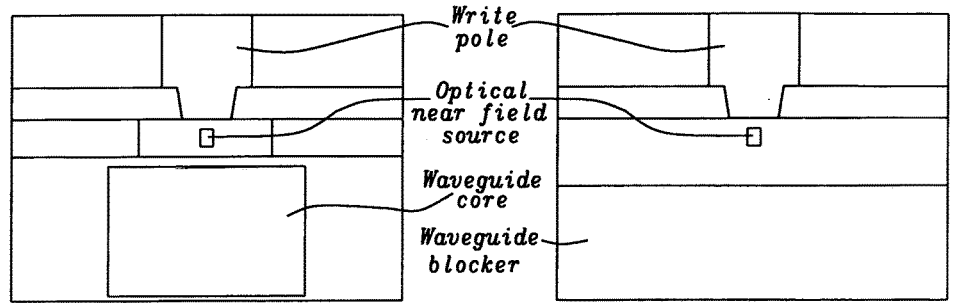
FIGS. 3A-3F schematically illustrates the beneficial effects of the waveguide blocker compared to a prior-art TAMR system that does not use the blocker. The effects shown include the temperature distribution in the head and the reduction of heat produced by the medium.

Referring first to FIG. 1A-1F, there is shown a TAMR writer structure with an integrated plasmon generator. Note, a plasmon generator is sometimes referred to as a "planar plasmon generator (PPG)" if its structure is substantially restricted to a horizontal plane, as is the case herein. The generator is sometimes referred to more simply as a "plasmon generator (PG)" if it is structured significantly both horizontally and vertically, which is not the present case. The method presented herein to improve the performance of a PPG can also be applied to a PG.

An exemplary prior art PPG implemented TAMR structure, like that taught by Jin et al. (U.S. Pat. No. 8,599,656) fully incorporated herein by reference, includes the basic structural elements schematically shown in three views in the left column (FIGS. 1A, 1C, 1E). The TAMR writer with waveguide blocker of the present disclosure is similarly shown in the right column, (FIGS. 1B, 1D, 1F).

FIGS. 1A and 1B shows the ABS views (looking up from the medium) of each structure, lateral cross-sectional views are shown in FIGS. 1C and 1D and magnified cross-sectional views are shown in FIGS. 1E and 1F. In each cross-sectional view the ABS is on the right end of the illustration. Note that the magnified view in FIG. 1E and FIG. 1F is a magnification of the relatively small region shown enclosed in a square box, 10, at the ABS end of FIG. 1C and square box 11 in FIG. 1D.

Looking first at FIG. 1C of prior art FIGS. 1A, 1C and 1D, the writer portion includes a yoke with main pole, 100, a return pole with leading shield, 160, and energizing coils, 110 (shown in cross-section). The optical light-energy delivery system, shown in box 10 of FIG. 1C and magnified in FIG. 1E includes a planar plasmon generator (PPG), 120, formed beneath the main pole, 100, as taught, for example, in the prior art of Jin et al. (U.S. Pat. No. 8,599,656). Note that other types of plasmon generators may be acceptable, such as that taught by Aoki et al. (U.S. Pat. No. 9,025,422) or by Shimazawa et al. (U.S. Pat. No. 8,000,178) and they need not be planar, although the present plasmon generator in this embodiment is planar in its geometrical structure. Further, the plasmon generator may be placed above or below a waveguide that is aligned with the writer core as shown. An adjacent channel-type waveguide, 150, that transfers optical radiation to the plasmon generator to excite plasmon modes by mode-beating, is formed beneath the plasmon generator, 120. The near fields of the plasmon modes ultimately heat the medium by Joule heating.

The waveguide blocker, is added in the three views of FIGS. 1B, 1D and 1F. As shown most clearly in magnified FIG. 1F (which is a magnification of the box 11 in FIG. 1D), it comprises the metallic blocker of triangular cross-section, 170, and a dielectric spacer layer, 180, formed on the blocker, which has a refractive index smaller than the waveguide core which makes it act as an anti-reflective layer, 155. The dielectric spacer is formed between the angled distal end of the waveguide 155 and the angled face of the waveguide blocker. The combination of blocker and spacer prevents optical radiative energy from the waveguide from striking and heating regions of the medium. Note in FIG. 1F the leading shield, 160, is immediately below the blocker, 170 and acts as a heat sink for the blocker. The leading shield is not a necessary component of this design, although some form of heat sink, such as a properly dimensioned layer of thermally conducting material is required to cool the blocker. In the present example the leading shield conveniently serves both functions, a shield and a heat sink. Note also in FIG. 1F the thickness of the dielectric spacer, 180, is denoted BWB, the angle 175 of the blocker face with respect to the upper surface of the leading shield is denoted BWA and vertical height of the dielectric spacer where it emerges at the ABS is denoted BWR.

As noted above, the plasmon generator (PG) (or planar plasmon generator (PPG) in the present case) can be, but it is not limited to, the type described in the prior art of U.S. Pat. No. 8,599,656 (Jin et al.). However, FIGS. 2A-2D shows that the preferred horizontal shape, not taught in Jin et al., of the presently disclosed planar plasmon generator (PPG), is a parabola 120, which is shown in top-down (horizontal cross-section) view FIG. 1A, vertical cross section view FIG. 1C, and ABS views FIGS. 1 B and D. The ABS is on the right side of the illustration in FIG. 1 A and FIG. 1 C. Note, the PPG has already been shown as 120 in side view in FIGS. 1E and 1F.

As noted, the presently disclosed PPG consists of a body shaped in its horizontal cross-section approximately as a parabola, 200, with a scalable feature, denoted a peg, 200a, projecting from its ABS end. The peg may have its width in a cross-track direction adjusted to the desired track pitch, most advantageously approximately 10 nm (nanometers) narrower than the pitch. In addition, the peg should be dimensionally optimized to balance the curvature requirements of the track, which is better for wider pegs, with the thermal gradients, which is better for narrower pegs. In addition, larger pegs are better cooled and, therefore, more reliable.

The peg, which has a height denoted, hPeg, emerges at a stepped distance, PPS, below the upper surface of the parabolic body. The peg has an upward rising bottom taper, 200b, that narrows it towards the ABS, where its height is denoted: hPegA. The dimensions of the peg should be in the following (approximate) range: length of peg, lPeg, 10 nm to 40 nm, height of peg, hPeg, 60 nm to 100 nm, width of peg, wPeg, 30 nm to 70 nm, PPS, 20 nm to 40 nm. The bottom taper should be chosen (angle 30°-70°), so that the peg height at the ABS (hPegA) is in the range of 20 nm-60 nm.

Figures 3C, 3D:
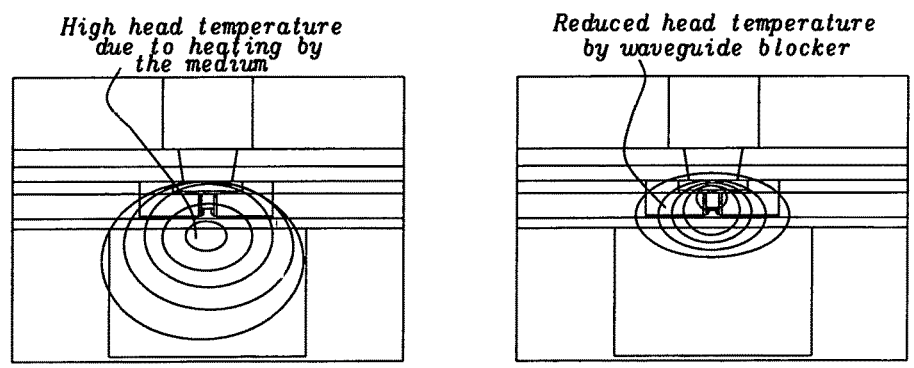
Figures 3E, 3F:
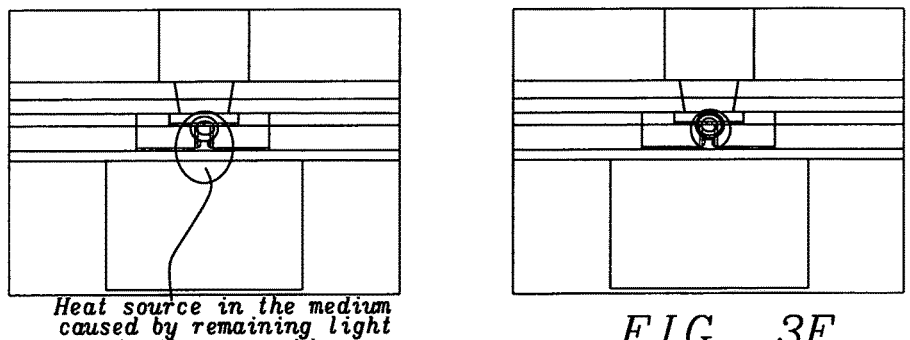

FIGS. 3A-3F shows the comparison between the prior art, FIGS. 3A, 3C and 3E and the present structure with waveguide blocker FIGS. 3B, 3D and 3F, with respect to ABS geometry in 3A and 3B, head temperature distribution at the ABS, in 3C and 3D and the temperature and the temperature characteristics of the thermal spot in the recording layer, in 3E and 3F. The waveguide blocker significantly decreases the head temperature in the waveguide region as shown in 3C and 3D. In addition, the waveguide blocker also reduces the background heating in the media (3E and 3F) and leads, therefore, to a more confined thermal spot in the recording layer and therefore to a better overall performance. No excessive heating of the waveguide blocker can be observed in 3D. The metallic blocker is protected by a dielectric material in the gap between it and the distal end of the waveguide. This material (e.g., Alumina or $SiO_2$) has a refractive index smaller than that of the waveguide core material (e.g., TaOx). The lower refractive index of the gap material causes it to act similarly to an antireflective coating and prevents excessive absorption in the lossy material of the metallic waveguide blocker.

Figure 4B:
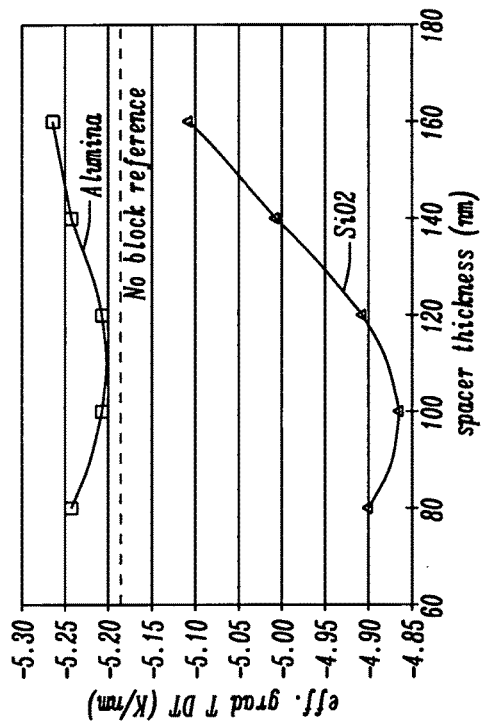
FIGS. 4A-D are graphical representations showing the role of spacer thickness (BWB) for two different low index of refraction materials.
Figure 4D:
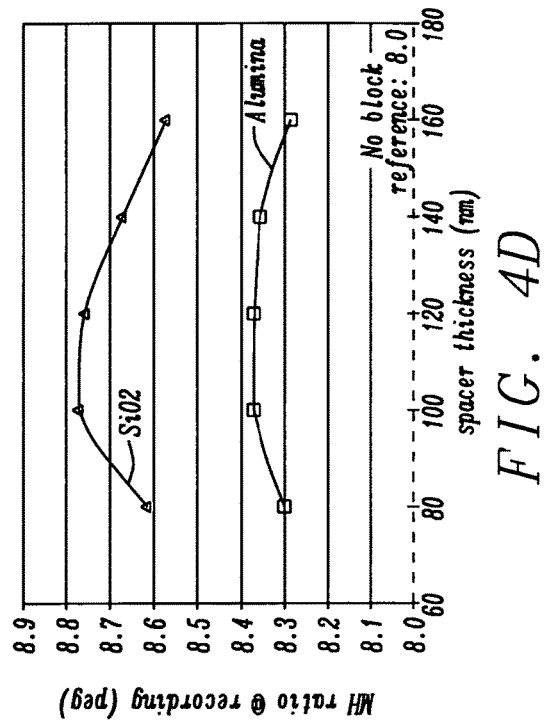
Figure 4A:
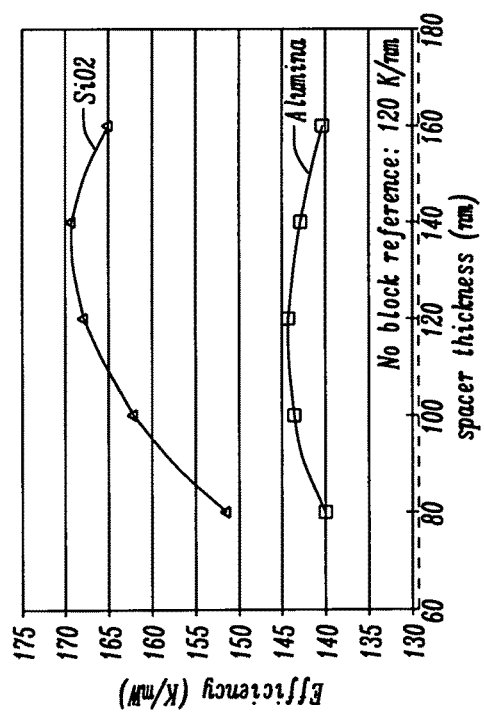
Figure 4C:
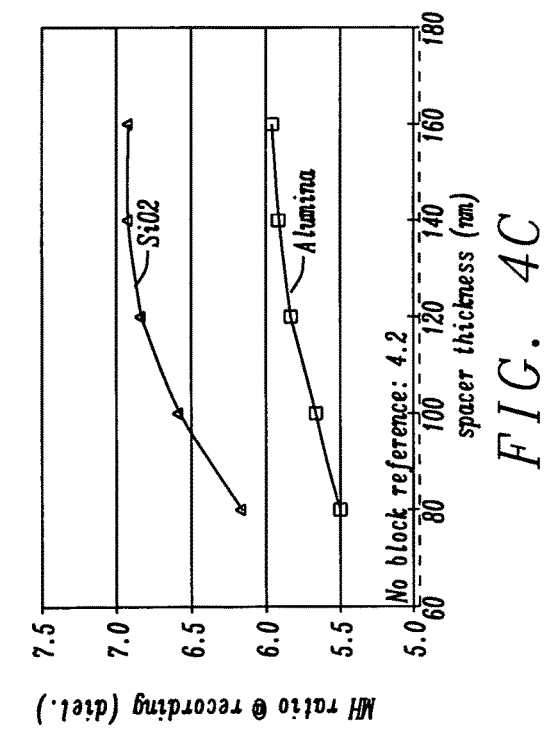
Figure 5A:
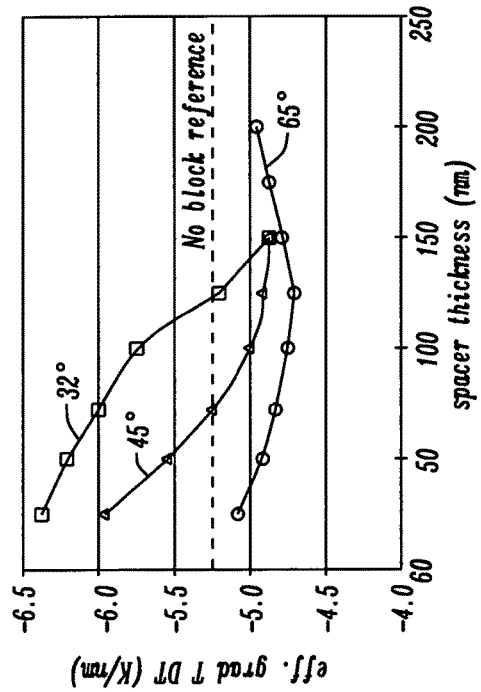
FIGS. 5A-D are graphical representation of the relationship between the blocker-waveguide-top recession (BWR) and blocker angles (BWA).
Figure 5B:
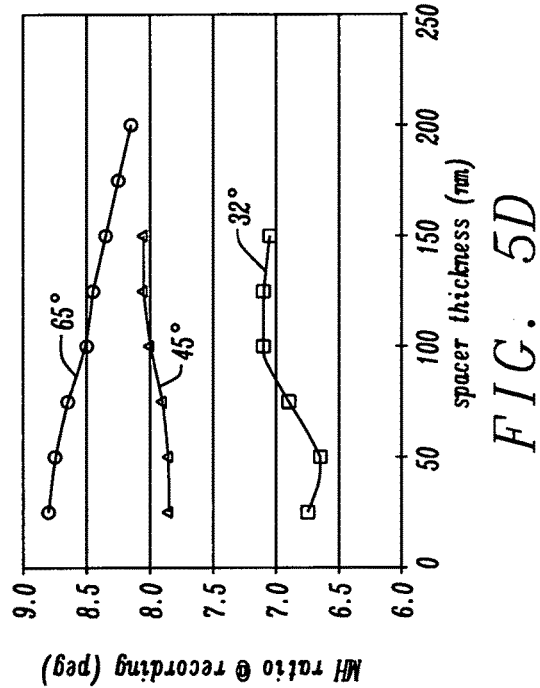
Figure 5C:
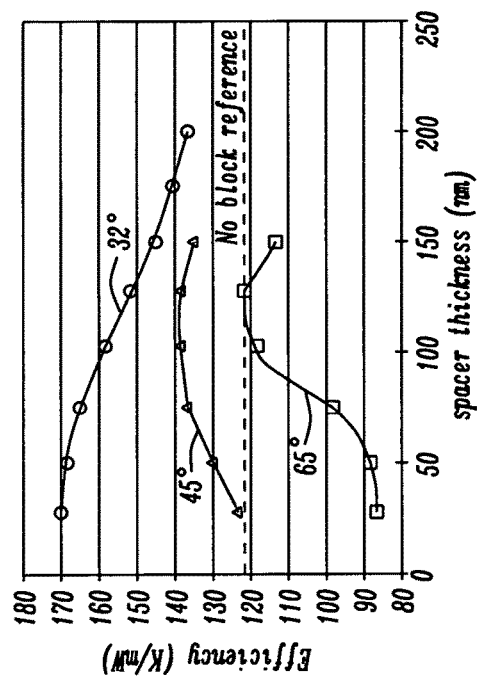
Figure 5D:
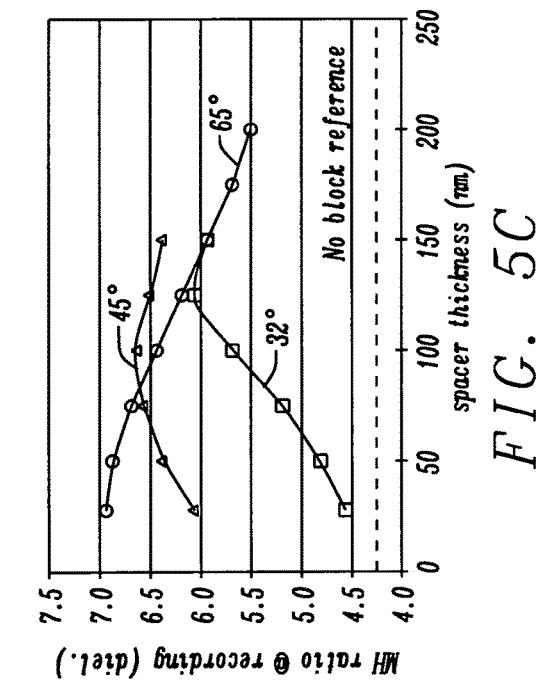

FIGS. 4A-4C graphically shows the dependence of four write head characteristics on the spacer thickness (BWB) for two different low index materials, Alumina and SiO2. The characteristics include efficiency (temperature increase per optical power increase) (4A), thermal down-track gradient (4B), medium-head temperature ratio (4C) at the dielectric region in front of the waveguide and (4D) the medium-head temperature ratio at the peg region. Simulation parameters are thermal conductivity of 0.02 W/K/m of the 2.5 nm thick air gap, BWR=50 nm and BWA=65°. There is a clear improvement of the medium-head temperature ratio at the dielectric region and the medium-head temperature ratio at the peg region.

Cooling of the waveguide blocker must be provided by attaching it to a larger metallic structure that acts as a heat sink, which is the leading shield in the present writer structure (see, 5, in FIG. 1F). However, in general, the heat sink need not be the shield. Unlike the "plasmon shield" of the prior art (taught, for example, in U.S. Pat. No. 8,295,132 (Jin et al.)), interaction of the blocker with the strong near field of the plasmon generator should be avoided, since the blocker is not needed to shape the near field spot of the planar plasmon generator (PPG). Therefore, a sufficient spacing between the PPG and the blocker (BWR>80 nm) and a triangular cross section of the waveguide blocker, 4, for minimizing the overlap between the blocker and the PPG is necessary. The dependency on the recession of the blocker with respect to the waveguide-top (BWR) as a function of different block angles (BWA) is shown in FIGS. 5A-5D. Simulation parameters are: thermal conductivity of 0.02 W/K/m of the 2.5 nm thick air gap, BWB=140 nm with SiO2 gap material. By choosing the proper blocker angle (BWA) and block waveguide-top recession (BWR), the efficiency is shown in 5A, performance in terms of down-track gradient is shown in 5B, media-head (MH) temperature ratio at the dielectric head region is shown in 5C and media-head temperature ratio at the peg position is shown at 5D. The results in 5A, 5B and 5D are similar to or slightly improved over the non-blocker prior art, while the results in 5C are clearly improved.

With an easily process-achievable blocker angle (BWA) of 45°, good dimensions for the waveguide blocker are BWR=100 nm, BWB=140 nm. If the metallic waveguide blocker is constructed of magnetic alloy material of Fe and Ni, e.g. the alloy "19 kG" or similar, it can provide a faster rise time of the writer than would be obtained using non-magnetic materials such as Ru, Rh, Ta or Cr.

Figure 6B:
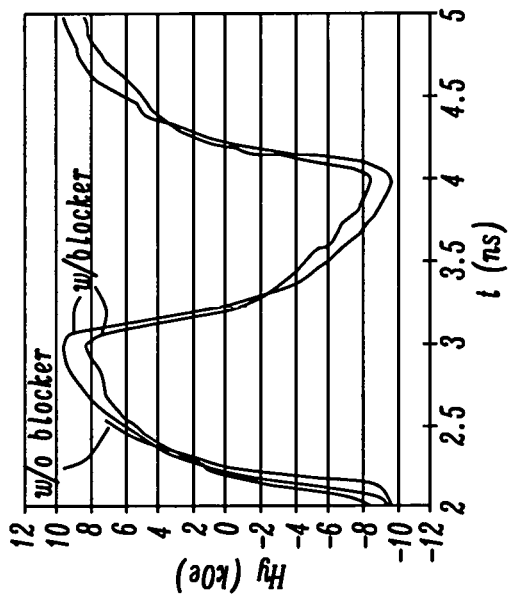
Figure 6A:
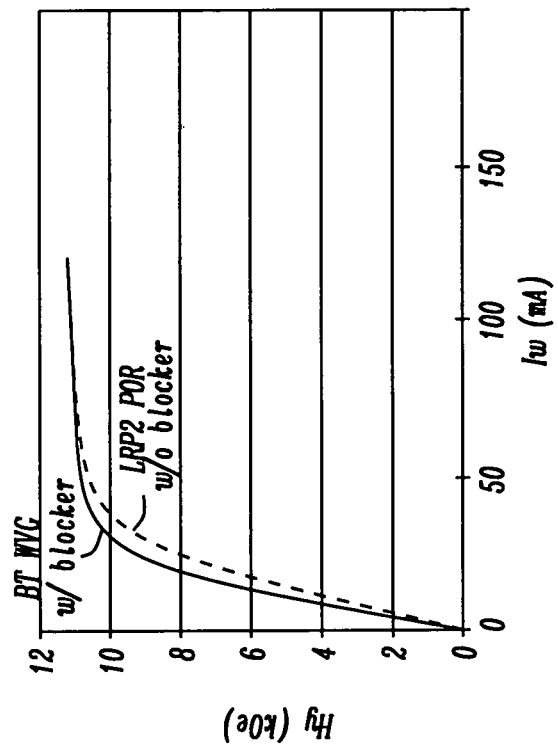

Referring to the magnetic writer performance as shown in FIGS. 6A-B, FIG. 6A is for a stationary and FIG. 6B for a time dependent simulation. As can be seen in 6A, the rise time, i.e., increase in perpendicular magnetic field $H_y$ as a function of energizing current, $I_w$ is improved with the blocker. As shown in time-dependent 6B, the rise time of the perpendicular magnetic field $H_y$ without overshoot as a function of time, t, in ns, for BWR=150 nm (w/o blocker and w/blocker) and BWR=50 nm, w/blocker.

Figure 7A:
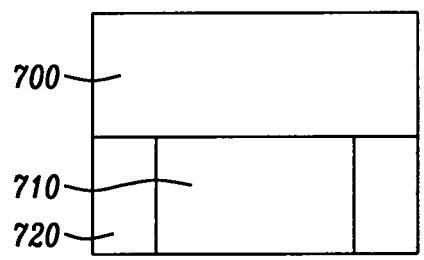
Figure 7B:
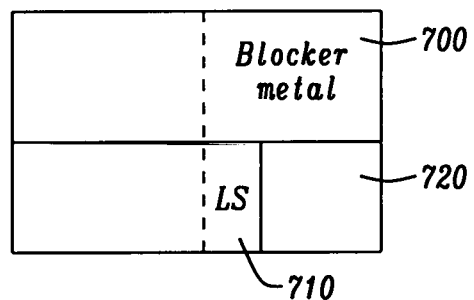

The process-flow that formed the waveguide blocker and the waveguide itself is now described with reference to schematic FIGS. 7A-7B through schematic FIGS. 13A-13C. Referring first to FIG. 7A, there is shown the ABS view of the deposition of a metal layer, 700, on the upper surface of the leading shield, 710, that has already been formed as part of the lower yoke of the writer, 720. Note, layer 710 need not be a leading shield, but it must be a heat-sink layer. In this embodiment, it will play a dual role of heat-sink and leading shield. The metal layer is preferably (non-magnetic) Ru, Ta, Rh or Cr or their alloys or composites or (magnetic) Fe, Co, or Ni or their alloys or composites. In FIG. 7B, there is shown a schematic lateral cross-sectional view of the formation in FIG. 7A. The material, 720, is dielectric material forming part of the writer core and surrounding the coils (not shown), which extends towards the right. Note, directions are here reversed from those of FIG. 1, where the dielectric material would extend towards the left.

Figure 8A:
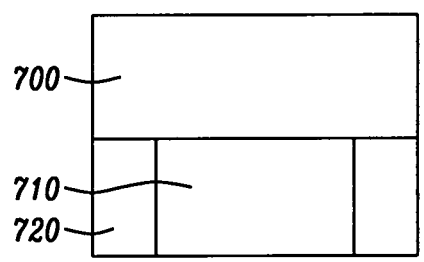
Figure 8B:
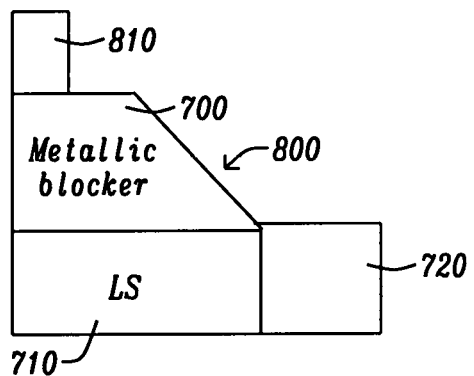

Referring next to FIG. 8B, there is shown the application of a layer of photoresist (PR), 810, to enable an ion-beam etch (IBE) to form an angled face, 800, on the metal layer, 700, which will form the blocker.

Figure 9A:
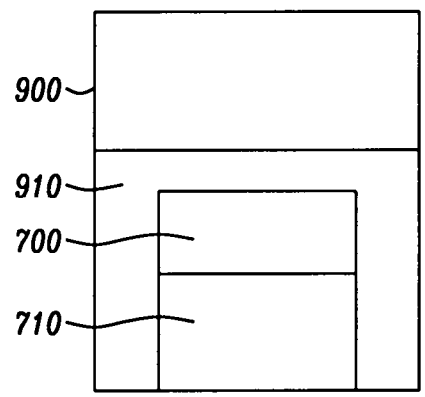

Referring next to FIGS. 9A and B, there is shown the structure in FIGS. 8A and B with a first layer 910 of dielectric material deposited on the angled face of the metal blocker layer. A second dielectric layer, 900, is deposited over layer 910 to form the core of the waveguide. First dielectric layer, 910, has a lower index of refraction than the second dielectric layer to make it act as an anti-reflective layer. The first layer, 910, is typically SiO$_2$ or Alumina, the second layer, 900, is typically TaOx.

Figure 9B:
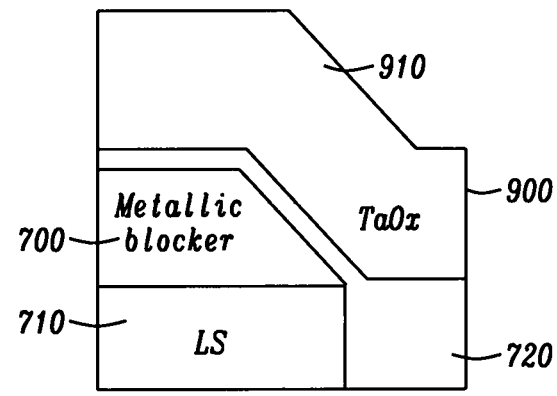
Figure 10A:
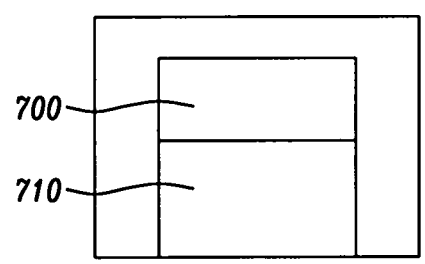
Figure 10B:
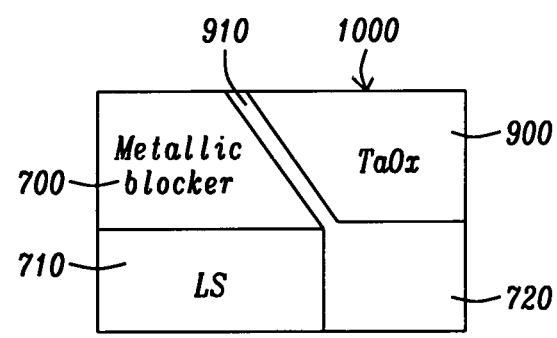

Referring next to FIGS. 10 A and B, there is shown schematically the fabrication of FIGS. 9 A-B subsequent to the application of a chemical-mechanical polishing (CMP) process to remove an upper portion of layers 910 and 900 and render the remaining surface, 1000, planar.

Referring next to FIGS. 11A, B and C, there is shown in each of A and C front planar views (parallel to an ABS plane, but viewed at different locations as shown in B). A side cross-sectional view is shown in B. A metal mask, 1100, has now been deposited onto planar surface 1000 that had been formed in FIGS. 10 A-C. FIG. 11B shows two vertical dashed lines, 1110 and 1120, indicating, respectively, where the actual ABS will finally be formed, 1110, and indicating a position inside the waveguide, 1120, for the purpose of illustrating its interior structure. FIG. 11C is, therefore, a view parallel to the ABS plane but within the waveguide core at dashed line 1120. The locations specified by planes 1110 and 1120 will be used in the following figures as well.

Referring next to schematic FIGS. 12A, B and C, there is shown the next step in forming the structure in FIG. 11. FIG. 12A is a view parallel to the ABS plane at the position of dashed line 1110 in FIG. 12B, which will be the actual ABS plane of the completed device. The waveguide structure will be further processed using patterning by ion-beam etch (IBE) to form openings, 1200, in the metal mask, 1100, and then using those openings to apply a reactive ion etch (RIE) through the previously formed dielectric core of the waveguide 900. FIGS. 12B and 12C show the resulting structure from the side cross-sectional view 12B and within the waveguide core at the position of dashed line 1120 in a cross-sectional plane parallel to the ABS.

Referring finally to FIGS. 13 A, B and C, there is shown the completed fabrication with the patterned core of the waveguide, 900, now being clad on its sides to complete the waveguide construction with the included blocker. The waveguide will finally be planarized, 1300, by CMP and remnants of the metal mask (1100 in FIGS. 12A, B and C) will be removed by dry etching.

As is understood by a person skilled in the art, the present description is illustrative of the present disclosure rather than limiting of the present disclosure. Revisions and modifications may be made to methods, materials, structures and dimensions employed in forming and providing a TAMR magnetic write head having planar plasmon generator activated by a waveguide with a waveguide blocker, while still forming and providing such a device and its method of formation in accord with the spirit and scope of the present disclosure as defined by the appended claims.

What is claimed is:

1. A method for forming a TAMR head, comprising:
   providing a magnetic write head having a main write pole and a heat sink layer formed on a leading edge side of said main write pole;
   depositing a first layer of metal on a horizontal surface of said heat sink layer;
   forming a tapered surface on said first layer of metal;
   depositing a first layer of dielectric on said tapered surface, then;
   depositing a second layer of dielectric on said first layer of dielectric wherein said second layer will form the core of a waveguide;
   planarizing said dielectric layers to remove excess dielectric material;
   depositing a metal mask on said planarized surface and patterning said mask using a patterned photoresist followed by an ion-beam etch (IBE) to define a waveguide shape;
   forming a waveguide using said patterned metal mask to guide a reactive-ion etch (RIE);
   planarizing said waveguide using chemical mechanical polishing (CMP) and using a dry etch to remove remnants of metal mask and then depositing a side cladding layer.

2. The method of claim 1 wherein said taper is formed by a method further comprising:
   forming a layer of photolithographic masking material on an upper surface of said layer of metal; then
   using an ion-beam etching (IBE) process guided by said layer of photolithographic masking material, form a tapered surface on a side of said layer of metal at a blocker angle BWA; then removing said layer of photolithographic masking material.

3. The method of claim 1 wherein said waveguide blocker is tapered to form a triangular cross-sectional shape, having a horizontal base that physically and thermally contacts said heat sink layer of said write head and wherein said taper is formed at said blocker angle, BWA, to said horizontal base, wherein said tapered side is adjacent to and conformal with said distal end of said waveguide and separated from said distal end of said waveguide by a dielectric filled gap.

4. The method of claim 1 wherein said waveguide blocker is formed with any regular cross-sectional shape that is capable of being configured to block excess electromagnetic radiation exiting a distal end of said waveguide.

5. The method of claim 1 wherein said first layer of metal is a metal which is electrically conducing but may be magnetic or non-magnetic.

6. The method of claim 5 wherein said non-magnetic metal is Ru, Ta, Rh or Cr or any of their alloys or combinations.

7. The method of claim 5 wherein said magnetic metal is Fe, Co or Ni or any of their alloys or combinations.

8. The method of claim 1 wherein said first layer of dielectric material has a smaller index of refraction than said second layer of dielectric material forming said core of said waveguide.

9. The method of claim 1 wherein said first layer of dielectric material is $SiO_2$ or alumina.

10. The method of claim 1 wherein said second layer of dielectric is TaOx.

11. The method of claim 1 further including the formation of a planar plasmon generator (PPG) adjacent to said waveguide.

* * * * *